(12) United States Patent
Ahuja et al.

(10) Patent No.: US 8,903,442 B2
(45) Date of Patent: *Dec. 2, 2014

(54) SYSTEM AND METHOD FOR MAINTAINING A BACKUP RADIO OPERATING PARAMETER LIST IN A SECONDARY USE COMMUNICATION SYSTEM

(75) Inventors: Ramandeep Ahuja, Chicago, IL (US); David P. Gurney, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/605,654

(22) Filed: Sep. 6, 2012

(65) Prior Publication Data

US 2013/0012250 A1    Jan. 10, 2013

Related U.S. Application Data

(62) Division of application No. 12/409,472, filed on Mar. 23, 2009, now Pat. No. 8,305,917.

(51) Int. Cl.
| | |
|---|---|
| *H04B 7/00* | (2006.01) |
| *H04L 12/24* | (2006.01) |
| *H04W 12/08* | (2009.01) |
| *H04W 48/00* | (2009.01) |
| *H04W 16/14* | (2009.01) |
| *H04W 28/18* | (2009.01) |
| *H04W 4/02* | (2009.01) |

(52) U.S. Cl.
CPC .............. *H04W 12/08* (2013.01); *H04W 16/14* (2013.01); *H04L 41/0681* (2013.01); *H04W 28/18* (2013.01); *H04L 41/12* (2013.01); *H04W 48/00* (2013.01); *H04W 4/02* (2013.01)
USPC .......... 455/509; 455/507; 455/513; 455/41.2; 455/450; 455/452.1; 455/452.2; 455/456.1; 455/456.5; 455/456.6; 370/252; 370/329; 370/332

(58) Field of Classification Search
USPC ........ 455/41.2, 507, 509, 512–514, 450, 451, 455/452.1, 452.2, 456.1, 456.5, 456.6; 370/252, 329, 332
See application file for complete search history.

(56) References Cited

U.S. PATENT DOCUMENTS 5,040,238 A    8/1991  Comroe et al.
(Continued)

FOREIGN PATENT DOCUMENTS

| WO | 9200632 A  | 1/1992 |
|---|---|---|
| WO | 9707602 A1 | 2/1997 |

OTHER PUBLICATIONS

H. Celebi et al—"Utilization of Location Information in Cognitive Wireless Networks" —Aug. 2007—IEEE—8 pages.
D. Gurney et al—"Geo-location Database Techniques for Incumbent Protection in the TV White Space" —2008—IEEE—9 pages.

(Continued)

*Primary Examiner* — Tuan A Tran
(74) *Attorney, Agent, or Firm* — Barbara R. Doutre

(57) ABSTRACT

A radio communication system (100) provides a radio air interface at a master node (102) for subscriber units associated with the master node. Among the subscriber units are several slave nodes (104, 106). The communication system has the ability to operate as a secondary user in unused spectrum portions of a frequency band otherwise reserved for primary operators. The master node accesses an authorization server (108) to obtain a list of unused channels in the region of the master node. Each slave node also contacts the authorization server to obtain a list of unused channels in the region where each respective slave node is located, via another network (118, 121). The unused channels common to the slave nodes and the master node are used to create a backup radio operating parameter list which is used by the master node if a fault occurs between the master node the authorization server.

17 Claims, 3 Drawing Sheets

(56) References Cited

U.S. PATENT DOCUMENTS

| | | | |
|---|---|---|---|
| 5,511,233 A | 4/1996 | Otten | |
| 7,027,827 B2* | 4/2006 | Bonta et al. | 455/502 |
| 7,146,176 B2* | 12/2006 | McHenry | 455/454 |
| 7,881,726 B2* | 2/2011 | Gurney et al. | 455/454 |
| 8,040,815 B2* | 10/2011 | Silk et al. | 370/252 |
| 8,041,380 B2* | 10/2011 | Hamdi et al. | 455/522 |
| 8,107,966 B2 | 1/2012 | Choi et al. | |
| 8,121,058 B2 | 2/2012 | Kattwinkel | |
| 8,130,708 B2* | 3/2012 | Singh | 370/329 |
| 8,305,917 B2* | 11/2012 | Ahuja et al. | 370/252 |
| 8,315,663 B2* | 11/2012 | Hamdi et al. | 455/522 |
| 8,447,315 B2* | 5/2013 | Hakola et al. | 455/452.1 |
| 8,660,498 B2* | 2/2014 | Gurney et al. | 455/67.11 |
| 8,666,317 B2* | 3/2014 | Choudhury et al. | 455/62 |
| 2006/0083205 A1 | 4/2006 | Buddhikot et al. | |
| 2008/0268892 A1 | 10/2008 | Hamdi et al. | |
| 2009/0034508 A1 | 2/2009 | Gurney et al. | |
| 2009/0061779 A1 | 3/2009 | Gurney et al. | |
| 2010/0061256 A1* | 3/2010 | Ang et al. | 370/252 |
| 2010/0091715 A1 | 4/2010 | Akchurin et al. | |
| 2010/0165913 A1* | 7/2010 | Ang et al. | 370/328 |
| 2011/0194485 A1 | 8/2011 | Horneman et al. | |
| 2012/0122477 A1* | 5/2012 | Sadek et al. | 455/456.1 |
| 2012/0135767 A1* | 5/2012 | Singh | 455/509 |
| 2013/0090071 A1* | 4/2013 | Abraham et al. | 455/73 |

OTHER PUBLICATIONS

R. Ahuja et al—"Cognitive Radio System Using IEE 801.11a over UHF TVWS" 2008—IEEE—9 pages.

Cavalcanti, D., et al., "Cognitive Radio Networks: Enabling New Wireless Broadband Opportunities", 3RD International Conference on, IEEE, 2008, May 15, 2008, pp. 1-6.

Extended European Search Report for counterpart Application No. 10756582.2 mailed on Nov. 22, 2013.

"Second Report and Order and Memorandum and Order; FCC-08-260A1", IEEE Draft; FCC-08-260A1, vol. scc41, Jan. 14, 2009, 132 pages.

Celebi, H., et al., "Utilization of Location Information in Cognitive Wireless Networks," Aug. 2007, 8 pages.

Gurney, D., et al., "Geo-location Database Techniques for Incumbent Protection in the TV White Space," 2008, 9 pages.

International Search Report and Written Opinion for counterpart International Application No. PCT/US2010/027270 mailed on Sep. 16, 2010.

International Preliminary Report on Patentability and Written Opinion for counterpart International Application No. PCT/US2010/027270 mailed on Oct. 6, 2011.

Non Final Office action mailed Mar. 29, 2012 in counterpart U.S. Appl. No. 12/409,472, Ramandeep Ahuja, filed Mar. 23, 2009.

Notice of Allowance mailed Jul. 20, 2012 in counterpart U.S. Appl. No. 12/409,472, Ramandeep Ahuja, filed Mar. 23, 2009.

* cited by examiner

SYSTEM AND METHOD FOR MAINTAINING A BACKUP RADIO OPERATING PARAMETER LIST IN A SECONDARY USE COMMUNICATION SYSTEM

CROSS-REFERENCE TO RELATED APPLICATION

The present application is a Divisional of U.S. application Ser. No. 12/409,472, filed Mar. 23, 2009 and of which priority is claimed.

FIELD OF THE INVENTION

The invention relates generally to cognitive radio networks, and more particularly to secondary-use networks which operate in unused channels of a spectrum portion reserved for primary operators.

BACKGROUND OF THE INVENTION

Radio communication is becoming increasingly widespread and used for a variety of communication purposes. As a result, the demand for radio frequency spectrum is likewise increasing. The concept of secondary-use radio systems has recently been proposed as a way of addressing radio spectrum demand. Secondary-use systems operate in the unused channels or spectrum portions of spectrum regions reserved for primary operators. Primary operators, or incumbents, are generally licensed to use a spectrum portion, such as a channel, and include entities such as television, commercial radio broadcasters, auxiliary broadcasting services (e.g. wireless microphones), radio-telephone operators, and land-mobile radio systems. Secondary use of spectrum is generally achieved though the use of cognitive radio techniques, which allow a radio unit to self-configure its operating parameter list to adapt to the ambient radio environment. Geo-location databases may be utilized to obtain information about the ambient radio environment, based on the location of the requesting radio unit or spectrum user. For example, in the United States, the geo-location databases can be queried in order to obtain channel availability information for secondary usage of the broadcast television spectrum, for example.

In a given geographic region, the spectrum region reserved for television broadcast will have a number of unused channels which may be made available to secondary use operators under appropriate conditions. For example, present proposals for secondary-use operation require a secondary-use operator to periodically update channel information used by the secondary-use operator to allocate radio resources. The channel information includes parameters such as which broadcast channels are occupied by primary operators (broadcasters), the allowed transmit power on unoccupied channels, and so on. To facilitate updating the channel information record used by a secondary operator, a database is maintained which correlates geographic location with channel usage of primary operators, as well as the other relevant channel parameters. The secondary-use operator may then query the database by providing the geographic location of the secondary-use operator's transmitter, and the database will provide channel information for that location in response which the secondary operator maintains as a radio operating parameter list or channel information record. A problem arises, however, when the secondary-use operator is unable to connect to the database, such as upon the occurrence of a network fault. Secondary-use may be regulated such that the secondary-use operator is required to refresh its channel information before commencing further communication activity. Therefore, there is a need for a way to keep channel information up to date despite potential fault conditions.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
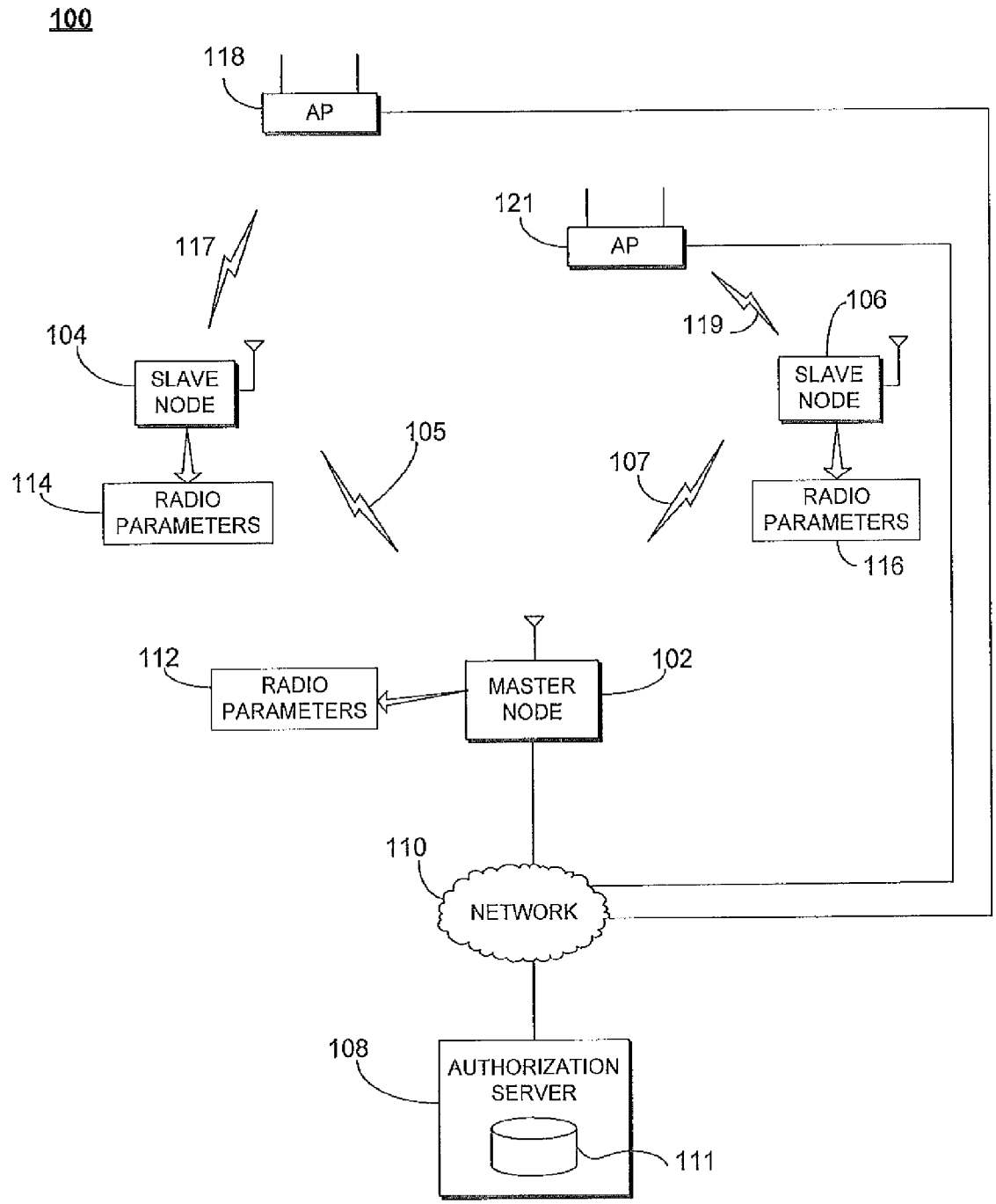
FIG. 1 shows a system diagram of a secondary-use communication system which maintains a backup radio operating parameter list, in accordance with an embodiment of the invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention solves the problem of providing reliable secondary-use operation with valid channel information in the presence of a fault condition which otherwise prevents a secondary user from obtaining valid the channel information. The reliability provided by the invention allows continued operation by maintaining a backup radio operating parameter list created and refreshed with the aid of several slave or network nodes. In particular, each assigned slave node is able to access the authorization server via alternative means, and obtain channel information based on its present location. Each slave node maintains a radio operating parameter list based on the channel information. The slave radio operating parameter lists are collected and compared, and a backup radio operating parameter list is created based on the channels available or common to all slave nodes. The backup radio operating parameter list may be distributed among the master and slave nodes.

Fault conditions may exist if one or more radio communication network nodes cannot access at least one authorization server. Typically, the master node in the network is responsible for controlling the radio operating parameters for other nodes in the network, including operating channel designations and assignments. If the master node loses its connection to the authorization server, such as upon the occurrence of a catastrophic fault, the network may otherwise have to shut down. The other nodes in the network can independently access one or more databases to obtain channel information, including radio operating parameters for the other nodes in the network (e.g., based on each nodes geo-location). Nodes can then exchange this information when the fault condition is detected and periodically when operating without fault. In this manner, each node in the network may store operating parameters for several other nodes.

Other fault conditions may also occur in the network, such as when multiple accessed databases contain differing information, such as differing channel availability lists, or other radio operating parameters. In this case, the network may choose to utilize the most favorable operating parameters to continue network operation without interruption. For example, the network may choose to use the highest allowed transmit power. This type of fault could occur when more than one database is being accessed by one or more nodes in the network, or when subsequent accesses to one or more databases produce differing operating parameters. In general, spectrum user operating regulations will require the user to access the database at some minimum time interval, typically daily. If a secondary user is unable to access the authorization server within a specified interval, it may be required to cease operation. Each network node's acquired channel information may be compared, and the overall network channel availability list may be composed of channels common to all network nodes. The backup radio operating parameter list may then be distributed among the master and slave nodes.

Referring to FIG. 1, there is shown a system diagram of a secondary-use communication system 100 which maintains a backup radio operating parameter list, in accordance with an embodiment of the invention. A master node 102 facilitates communication activity for one or more subscriber or mobile units, such as slave nodes 104 and 106. The master node may be a base station or included in a base station which provides an air interface for associated radio communication devices in the geographic vicinity of the master node. The master node operates at least in part as a secondary user of a spectrum region or frequency band normally reserved for, and typically licensed to primary operators. For example, the master node may use unused television broadcast channels to support radio communication with its associated subscriber units. The master node may also operate as a primary operator in another spectrum region, and engage in secondary-use operation to increase system capacity or interoperability, when possible. Such an arrangement is possible for public safety radio networks, which have a reserved, primary spectrum region for their exclusive use, but need additional channel capacity. Accordingly, the slave nodes may be public safety radios, such as handheld two-way radios used by police and other public safety personnel. However, the inventive arrangements may be equally applied to other communication systems as well. For example, the master node may be a neighborhood wireless data or internet access point, which operates at a higher power level than a conventional wireless local area networks, with the subscriber units being wireless modems used by people living in the neighborhood and used to access data and other services. Several, if not all of the subscriber units supported by the master node may be selected to act as slave nodes. Each slave node's location may be known by the slave node, such as by use of an on-board global positioning satellite (GPS) receiver for receiving satellite positioning signals, or if the slave node is in a fixed location and not mobile, the slave node may be programmed or provided with its location. Alternatively, only the operating region of the network nodes may be known, in which case the worst case operating parameters may be used by the node for the entire operating region. The slave nodes communicate with the master node via radio links 105, 107, respectively, which may be radio links operated in either a primary spectrum region reserved for the master node, or in a secondary spectrum region in which the master node is allowed to operate as a secondary user.

Secondary-use operation requires the communication system 100 to use available or unused channels that are within a spectrum region reserved for other forms of communication, or other operators. To ensure that the communication system 100 does not interfere with licensed or other primary operators, the master node queries an authorization server 108 over a network 110 to ascertain which channels in the region of the master node are available for use. The authorization server may also provide other channel information, such as the maximum transmit power that may be used on unoccupied channels, whether there are sub-channels in use within the broadcast channels, and so on. The query by the master node includes a location of the master node. The authorization server includes, or is operably coupled to a database 111 which maintains a listing of channels in use and the regions where they are being used, and may include other channel information as mentioned. The database may, for example, note the location of each primary operator's transmitter, the primary operator's assigned channel, and a radius corresponding to an associated coverage area. Additional information such as, for example, detailed transmitter characteristic including radiated power, antenna height, and antenna patterns may also be included in the database. The database may further include similar information regarding other secondary users operating in the same region. Upon receiving the query from the master node, the authorization server may execute an application program which compares the master node's location with the coverage area of each operator for each channel to determine the channels that are available for use. The authorization server may then return the available channels to the master node, and any other channel information that may be relevant. The master node maintains the returned channel information as a master radio operating parameter list as one of the radio operating parameter lists 112 maintained by the master node. The master node, as will be described herein in more detail, may also maintain a backup radio operating parameter list among its radio operating parameter lists 112.

The master node may assign one or more of the slave nodes to each obtain or acquire a slave radio operating parameter list. The slave radio operating parameter list is record of channel information regarding channels designated for a primary communication system in a given spectrum region which may be accessed for secondary use purposes. Each assigned slave node may then query the authorization server 108, or a similar authorization server, and provide its location to the queried server. The authorization server then returns channel information based upon the location of querying slave node. Each slave node then maintains its respective received channel information as a slave radio operating parameter list in a local radio operating parameter list repository, as indicated by radio operating parameter list repositories 114 and 116, for slave nodes 104 and 106, respectively. The repositories may simply be memory in the slave nodes, such as a non-volatile reprogrammable memory. The slave nodes may also acquire their respective slave radio operating parameter lists via the master node, however, upon the occurrence of a fault condition between the master node and the authorization server preventing access to the authorization server, the slave nodes may use an alternative network access point or communication service to communicate with the authorization server. For example, each slave node 104, 106 may connect to a wireless local area network (WLAN) access point, such as access points 118 and 121 via WLAN radio links 117 and 119, respectively. Alternatively, the slave nodes may access the network by any other suitable access means, including cellular telephony network access points such as cellular base stations, wired communication links, public safety radio networks, and personal area network links such as those provided in accordance with IEEE 802.15 specifications. For the present example, the access points 118, 121 may support WLAN communication in accordance with IEEE 802.11 standards.

The slave nodes may be prompted by the master node to obtain their respective slave radio operating parameter lists, or they may be provided or programmed with instructions to do so autonomously. A slave node may refresh its slave radio operating parameter list upon the occurrence of various events, including a scheduled period update event, or if the slave node has substantially moved location from the previous location where the slave node last queried the authorization server. The location of the slave node may be monitored by the slave node itself, or by the master node, in order to cause the slave node to refresh it slave radio operating parameter list.

To create a backup radio operating parameter list, the master and slave radio operating parameter lists are compared to determine common channels that are available to the master node and all slave nodes, as well as associated information, if any, such as transmission power limits and other such parameters. One method of performing the comparison is by a simple logical intersection operation on the lists to determine the commonly available channels. The comparison operation may be performed by having the slave nodes transmit their respective slave radio operating parameter lists to the master node, which then performs the comparison. The common channels make up the backup radio operating parameter list. If, upon performing the comparison, there is an insufficient number of common channels, such as zero, or some other preselected number, then a process may be commenced to exclude one or more slave radio operating parameter lists. For example, slave nodes that are located remotely from other slave nodes, or have a low activity level may be candidates to exclude from the process. Once the backup channel information is determined, it may be distributed to some or all of the nodes to be maintained with their respective radio operating parameter lists. Furthermore, it will be appreciated by those skilled in the art that the master and slave nodes may be peer units, where one peer has a dedicated connection to the authorization server, and accordingly fulfills the role of master node.

Figure 2:
FIG. 2 shows a backup radio operating parameter list determination process, in accordance with an embodiment of the invention.

FIG. 2 shows a backup radio operating parameter list creation process 200, in accordance with an embodiment of the invention. The process is one way of determining channels that are available to all nodes in the communication system. A master radio operating parameter list 202 and slave radio operating parameter lists such as record 204 are compared, for example, by a logical intersection operation, denoted by the "∩" symbol. The result produces the backup radio operating parameter list 206. For example, the master node may have channels {2, 5, 10, 14, 16, 22} available, a first slave node may have channels {3, 4, 10, 14, 17, 36} available, and a second slave node may have channels {6, 9, 10, 12, 13, 14, 20, 25} available, resulting in common channels 10 and 14 being the channels listed in the backup radio operating parameter list. In the event that no channels are found by the process, one or more slave records may be excluded. Those slave nodes from which the excluded record or records came are dropped or deassociated from the communication system, at least until circumstances change such that they may resume communicating on a useable channel.

Figure 3:
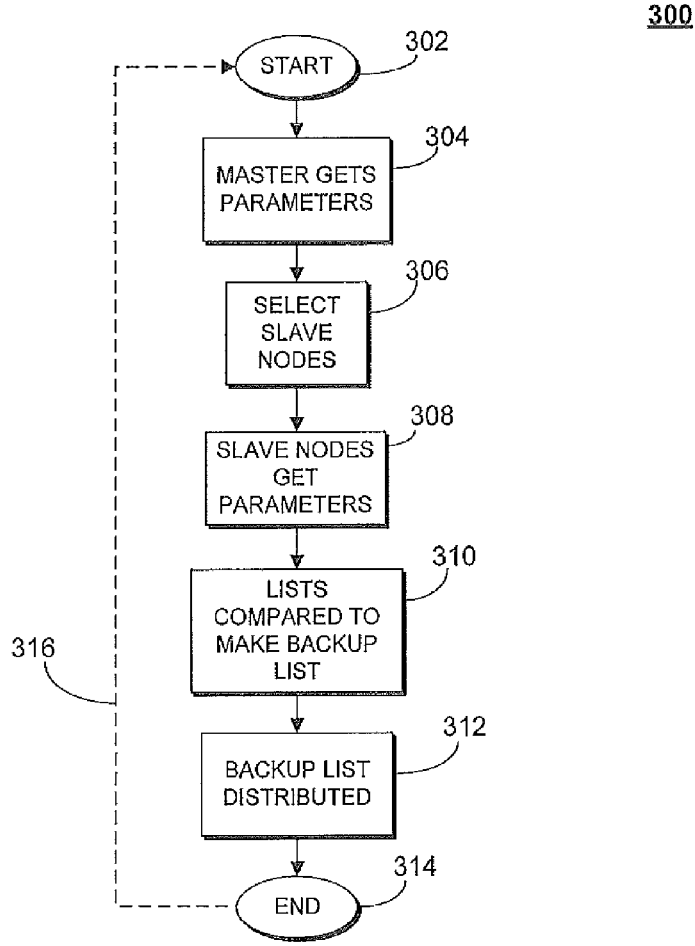
FIG. 3 shows a flowchart diagram of a method for creating and maintaining a backup radio operating parameter list, in accordance with an embodiment of the invention.

FIG. 3 shows a flowchart diagram of a method 300 for creating and maintaining a backup radio operating parameter list, in accordance with an embodiment of the invention. At the start 302 the master and slave nodes are powered up, and ready for operation. The slave nodes may be in communication with the master node on a secondary-use channel that has been previously found to be available, or they may not have yet commenced communication on the secondary-use channels and use radio resources reserved for primary use by the communication system. For example, the communication system may be a public safety radio system which has reserved channels for the exclusive use by the public radio system in one spectrum region, and which operates as a secondary user in unused television broadcast channels in the vicinity of the communication system. The master node commences obtaining or acquiring a master radio operating parameter list (304). This may be the initial master radio operating parameter list, or it may be a refreshed record which the master node may be required to obtain periodically. The master radio operating parameter list includes a list of channels in a spectrum region reserved for a primary operator, but which are available for secondary use, and may further include other channel information such as permissible transmission parameters when using the available channels. The availability of channels depends on the location of the master node. That is, the authorization server cross references the geographic coordinates of the master node with the locations of primary operator transmitters in the same region, and based on the power level of those transmitters, which is also known at the authorization server, the authorization server can determine which primary operator's transmission range covers the area in which the master node is located. The channels on which primary operators are transmitting which cover the area where the master node is located are excluded from the record. Any channels which have no incumbent operators in the region of the master node, or which are used by an incumbent operator whose transmitter is far enough away and operating at a power level such that the incumbent operator's transmission does not sufficiently overlap the region of the master node may be included in the channel information. The master node may send an identifier which the authorization server may use to access a lookup table to find previously stored location information associated with the master node, or the master node may transmit a query including the location of the master node to the authorization server. The master node then receives the channel information, including a list of available, unused channels in the target spectrum based upon the master node's location.

The master node may identify and assign several slave nodes (306) to assist in forming the backup radio operating parameter list. The slave nodes may be selected based on their geographic location, so as to obtain results from a sufficiently large area, and so as to obtain results from a geographically diverse area supported by the master node. Accordingly, the master node may select slave nodes that are geographically dispersed. Each assigned slave node acquires a slave radio operating parameter list (306) either as an initial process or as a refresh operation. Each of the slave nodes may obtain their respective slave radio operating parameter list by using an alternative network, such as a wireless local area network, a public safety radio network, or a cellular telephony network. The slave nodes' transceivers may be designed to operate on these alternative networks, or the slave nodes may be provided with secondary transceivers for access the alternative networks. The slave radio operating parameter lists are produced with channel information provided by the authorization server, or by another authorization server which provides the same functionality, based upon the location of the requesting slave node. The slave nodes, generally being mobile, may be equipped to determine their own location, such as with a satellite positioning receiver.

Once all of the nodes have a sufficiently current channel information, a backup radio operating parameter list is derived by comparing (310) the master and slave radio operating parameter lists. Once the backup radio operating parameter list is produced, it may then be distributed (312) to one or more slave nodes. The method may then terminate, at least temporarily until a condition occurs which necessitates repeating (316) some or all of the processes. In the event of a fault condition which prevents the master node from presently refreshing the master radio operating parameter list, the previously acquired master radio operating parameter list may be used with refreshed slave radio operating parameter lists which the slave nodes obtained by using other communication access networks. Given that the slave nodes surround the master node, it is unlikely that a channel in the resulting backup radio operating parameter list will not be available to the master node.

The above methods may be extended to include gathering additional information from the geo-location database, such as, for example, maximum allowed transmit power level per network node, operational center frequency, and/or maximum allowed operational bandwidth. In these cases, the network may choose to operate with the highest allowed transmit power level, or highest allowed operational bandwidth for all participating nodes in the network. Other information about the operating environment, such as expected interference levels, from primary and/or secondary incumbent systems may also be provided by the database and shared amongst the network nodes.

Figure 4:
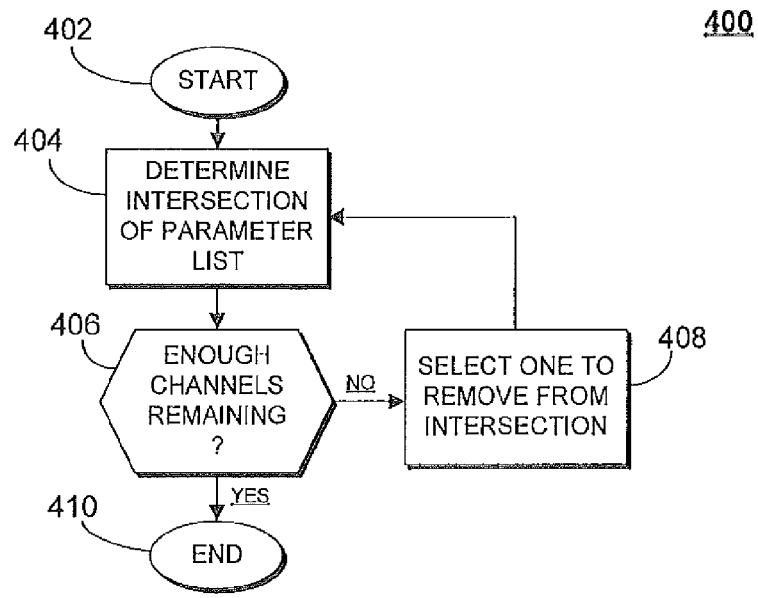
FIG. 4 shows a flowchart diagram of a process for selecting slave radio operating parameter lists for creating a backup radio operating parameter list, in accordance with an embodiment of the invention.

FIG. 4 shows a flowchart diagram 400 of a process for selecting slave radio operating parameter lists for creating a backup radio operating parameter list, in accordance with an embodiment of the invention. The present method illustrates how one or more slave radio operating parameter lists maybe excluded from the comparison to produce the backup radio operating parameter list. At the start 402, the method uses all available slave radio operating parameter lists. The method then determines the common channels among the slave nodes, such as by an intersection operation 404. The method then determines if a sufficient number of common channels have been found (406). If not, then a slave radio operating parameter list may be removed from consideration (408) and the comparison process is repeated until a sufficient number of channels are found, whereupon the method ends (410). The criteria for removing a slave radio operating parameter list may include removing the record with the fewest common channels, as well as examining the activity level of the slave nodes, and any one which may be sufficiently remote and have a sufficiently low activity level may be removed from consideration. The method may be performed at the master node, although it may be delegated to any node or other suitable equipment connected to the communication system. When a slave radio operating parameter list is excluded from the method, the slave node which provided the record may be de-associated from the master node. Furthermore, it is contemplated that the master node may not participate in the method, such as in the case where the master node suffers a severe failure, and the resulting channels in the backup radio operating parameter list may be used for direct radio to radio communication, rather than infrastructure-assisted communication via the master node.

More generally, the method may be described as a method for acquiring radio operating parameters in a radio communications network, wherein the method involves obtaining, at a first radio node in the radio communications network, first radio operating parameters from an authorization server. The authorization server maintains access to a geo-location database of radio operators and their operational information, which may include the location of transmission antennas, transmission power levels, antenna height, transmission frequency or channel, and so on. The first radio operating parameters being based on a location of the first radio node. A second radio node obtains, which is in radio communication with the first radio node, second radio operating parameters from an authorization server, which may be the same or a different authorization server. The second radio operating parameters are likewise based on the location of the second radio node, and obtained in response to a query from the second radio node at the queried authorization server. The first and second radio operating parameters may include a channel availability list, a maximum allowed transmit power level, an operating frequency, an operational bandwidth, or an interference level. The radio nodes may exchange their respectively obtained radio operating parameters. At least one of the nodes may then determine common radio operating parameters from the first and second radio operating parameters. The common radio operating parameters being operating parameters which both the first and second radio nodes can use for operation. The common radio operating parameters may be distributed to the first and second radio nodes. In one embodiment of the invention, the first node is a master node. Upon detection of a fault at the master node which prevents any further obtaining of radio parameters from the authorization server, the second radio node may commence operating in accordance with the common radio operating parameters. The second radio node may obtain the second radio operating parameters over a secondary communication system.

Figure 5:
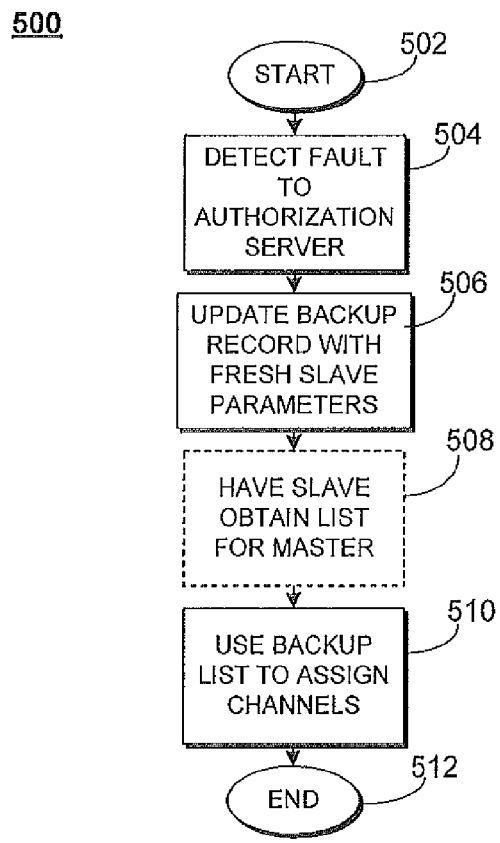
FIG. 5 is a flowchart diagram of a method for using a backup radio operating parameter list under a fault condition at a master node, in accordance with an embodiment of the invention.

FIG. 5 is a flowchart diagram of a method 500 for using a backup radio operating parameter list under a fault condition at a master node, in accordance with an embodiment of the invention. At the start 502, the master node attempts to connect to the authorization server to acquire a channel information to produce a valid master radio operating parameter list. The master node may do so for regulatory compliance, for example, where regulations require the secondary-use operators to periodically re-fresh their channel information. However, the master node may be unable to connect with the authorization server due to a fault, which is detected (504). If the fault is simply in the connection between the mater node and the authorization server, the master node can detect the fault. If the master node itself fails, then the fault may be detected by one or more of the slave nodes, which may have been delegated to act as an interim master node in such an event. The method then refreshes the backup radio operating parameter list with fresh slave radio operating parameter lists (506) which are produced by the slave nodes by acquiring channel information via other communication networks, as previously described. The most recent master radio operating parameter list may be included in the determination. Alternatively, a designated slave node may have been informed with the location of the master node, and may query the authorization server to acquire channel information to produce a master radio operating parameter list (508). The resulting backup radio operating parameter list may then me used to define channels for the communication system (510), and the method presently terminates (512).

This invention can be embodied in other forms without departing from the spirit or essential attributes thereof. Accordingly, reference should be made to the following claims, rather than to the foregoing specification, as indicating the scope of the invention.

What is claimed is:

1. A method for maintaining a backup radio operating parameter list in a secondary use communication system, comprising:
    obtaining, at a master node, a master radio operating parameter list from an authorization server, wherein the master radio operating parameter list is based on a location of the master node;
    assigning a plurality of slave nodes that are in radio association with the master node to each acquire a slave radio operating parameter list from the authorization server based on the locations of each of the slave nodes and using a different network than used by the master node to obtain the master radio operating parameter list;
    deriving the backup radio operating parameter list from the master and slave radio operating parameter lists; and
    distributing the backup radio operating parameter list to at least one slave node.

2. The method of claim 1, wherein the radio operating parameter lists indicate available television broadcast channels in the vicinity of the master and slave nodes.

3. The method of claim 1, wherein each of the slave nodes obtain the slave radio operating parameter lists by using one of a wireless local area network, a public safety radio network, or a cellular telephony network.

4. The method of claim 1, wherein the backup radio operating parameter list is substantially the intersection of available channels in the master and slave radio operating parameter lists.

5. The method of claim 4, wherein, when upon first determining the intersection the number of available channels is less than a preselected number of channels, at least one slave radio operating parameter list is dropped from consideration, the intersection is then found with the remaining slave radio operating parameter lists, and the slave node corresponding to the dropped slave radio operating parameter list is removed from association with the master node.

6. The method of claim 5, wherein the dropped slave node is selected by determining the slave radio operating parameter list having a fewest number of common channels with the master and other slave radio operating parameter lists.

7. The method of claim 5, wherein the dropped slave node is selected by determining a slave node having a lowest communication activity level among the slave nodes.

8. The method of claim 1, wherein the method is repeated periodically and upon the occurrence of an error preventing the master node from obtaining a present master radio operating parameter list, selecting channels from the backup radio operating parameter list.

9. The method of claim 1, wherein assigning the plurality of slave nodes comprises selecting slave nodes that are geographically dispersed in a serving region of the master node.

10. A communication system providing fault tolerance when operating in secondary-use mode, comprising:
    a master node configured to provide a radio communication air interface in the vicinity of the master node, wherein the master node is further configured to obtain a master radio operating parameter list for secondary-use operation from an authorization server, the master radio operating parameter list indicating available channels for secondary-use at a location of the master node;
    a plurality of slave nodes associated with the master node via the radio communication air interface, wherein each slave node obtains, from the authorization server via an alternative network access point, a slave radio operating parameter list, each slave radio operating parameter list indicating available channels for secondary-use at a location of the requesting slave node;
    wherein the communication system creates a backup radio operating parameter list of channels common to the master and slave radio operating parameter lists, and wherein upon the occurrence of a fault between the master node and the authorization server the backup radio operating parameter list is used to select channels for secondary use.

11. The communication system of claim 10, wherein the master node creates the backup radio operating parameter list.

12. The communication system of claim 11, wherein the master node distributes the backup radio operating parameter list to the slave nodes.

13. The communication system of claim 11, wherein the radio operating parameter lists indicate unused television broadcast channels in the vicinity of the master and slave nodes.

14. The communication system of claim 11, wherein each of the slave nodes obtain the slave radio operating parameter lists by using one of a wireless local area network, a public safety radio network, or a cellular telephony network.

15. The communication system of claim 14, wherein the excluded slave radio operating parameter list is from a slave node having a lowest communication activity level.

16. The communication system of claim 11, wherein the backup radio operating parameter list is created by selectively excluding slave radio operating parameter lists until at least a preselected number of common channels are found, and wherein the master node de-associates from slave nodes whose slave radio operating parameter lists have been excluded.

17. The communication system of claim 16, wherein the excluded slave radio operating parameter list is selected by determining the slave radio operating parameter list having a fewest number of common channels with the master and other slave radio operating parameter lists.

\* \* \* \* \*